United States Patent
Weidel

(10) Patent No.: US 6,236,520 B1
(45) Date of Patent: May 22, 2001

(54) LIGHTING DEVICE FOR PICTURE RECORDING

(75) Inventor: Edgar Weidel, Senden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/380,577

(22) PCT Filed: Feb. 28, 1998

(86) PCT No.: PCT/EP98/01144

§ 371 Date: Mar. 27, 2000

§ 102(e) Date: Mar. 27, 2000

(87) PCT Pub. No.: WO98/40210

PCT Pub. Date: Sep. 17, 1998

(30) Foreign Application Priority Data

Mar. 7, 1997 (DE) ............................................. 197 09 302

(51) Int. Cl.[7] ............................................... G02B 3/06
(52) U.S. Cl. ..................... 359/710; 359/457; 359/618; 359/622
(58) Field of Search ................................... 359/457, 618, 359/621, 619, 622

(56) References Cited

U.S. PATENT DOCUMENTS

| 4,971,415 | 11/1990 | Hara et al. ...................... 350/96.11 |
| 5,206,761 | * 4/1993 | Ogino ................................... 359/457 |
| 5,631,754 | * 5/1997 | Jannson et al. ........................ 349/64 |

FOREIGN PATENT DOCUMENTS

| 8902905 | 5/1990 | (DE) . |
| 41 00 654 C2 | 7/1992 | (DE) . |
| 43 35 244 A1 | 6/1995 | (DE) . |
| 57-11247 | 7/1982 | (JP) . |
| 60-193140 | 10/1985 | (JP) . |
| 63-087780 | 4/1988 | (JP) . |

* cited by examiner

Primary Examiner—Scott J. Sugarman
Assistant Examiner—Timothy J Thompson
(74) Attorney, Agent, or Firm—Venable; Norman N. Kunitz

(57) ABSTRACT

The invention relates to a device for picture recording that is used in image sensors in robotics, navigation and surveillance systems. Said device comprises a lighting device having several series connected lasers as a light source and a dispersing lens as well as an optical element with which high luminance laser light is emitted while complying with safety regulations.

9 Claims, 1 Drawing Sheet

LIGHTING DEVICE FOR PICTURE RECORDING

BACKGROUND OF THE INVENTION

The invention relates to a device for picture recording with a lighting device, having a laser light source and an optical element illuminated by this laser light source for forming the laser light, and wherein the optical element is illuminated by a dispersing lens arranged between the laser light source and the optical element the preamble to patent claim 1.

The invention is used with image sensors in the field of robotics, navigational systems and monitoring systems. A semiconductor laser, preferably expanded in one direction, is the preferred light source for such sensors. The camera used is preferably a charge-coupled device (CCD) camera with an electronically controlled shutter. Optical filters, installed in front of the camera objective, will filter out the light reflected by the illuminated object from the surrounding visible and infrared light, so that it is essentially the laser light that is processed into an image in the camera.

If a laser is used as a light source, the regulations for preventing accidents caused by laser radiation must be observed. Given the expanded radiation of the laser light and a wavelength of 750–850 nm, e.g., for a GaAs laser, these regulations only permit a laser output of 50–100 mW in order to stay within the maximum permissible radiation for laser light affecting the eye retina.

An arrangement for recording pictures is described in the German Unexamined Published Patent application No. P43 35 244. The laser output for this arrangement is distributed such that a point image of the laser light source cannot be formed with an optical system that is located in the illumination range, e.g., the human eye, if applicable with auxiliary means. This does not detract from the illumination characteristics of the lighting device, e.g. through generating a fan-shaped light bundle. In addition, the US 4 971 415 A and JP 60 193 140 disclose circular-arc type arrangements of several semiconductor lasers.

It is the object of the invention to provide a lighting device for recording pictures, which makes it possible to maintain the maximum permissible radiation for laser outputs exceeding 1 W over the total illumination range, has good spatial resolution characteristics and a high picture frequency, and can be produced with a compact design.

SUMMARY OF THE INVENTION

The above object generally is achieved according to the present invention by a lighting device for recording pictures, which comprises a laser light source and an optical element illuminated by the light source for forming the laser light, with the illumination of the optical element occurring via a dispersive lens that is arranged between the laser light source and the optical element; and wherein: the laser light source comprises several electrically serially connected lasers that are arranged in a circular arc shape such that the center point of the circular arc is located on the optical axis of the dispersive lens; the optical element is configured with several cylindrical lenses, with the cylindrical lens arranged on the side facing the laser light source being a converging lens, with converging lens being followed by additional cylindrical lenses, and with these cylindrical lenses have a plurality of tightly joined, planar microlenses on the side facing away from the laser. Advantageous embodiments and/or modifications additionally are described.

The invention has the advantage that by changing a point-shaped laser light source, into an expanded light source and by having a square light output surface for the lighting device, optimum conditions are created for the maximum permissible irradiation of the eye retina (see also IEC 825/1). In order to obtain an optimum illumination of a square surface area with a laser having a directional divergence, several individual lasers are arranged in a circular-arc shape, so that the laser light strikes a dispersing lens directly, without significant emission losses on the side, and is expanded in such a way that an optical element located at the output of the lighting device is illuminated to the maximum degree. It is furthermore advantageous if several individual lasers are connected in series, thereby generating the same laser light output (e.g., 0.8 W/A per laser), but with less electrical current. A further increase in the laser output of up to 200 W can be achieved with a pulsed operation of the laser light source and pulse lengths, ranging from a few nanoseconds up to several hundred nanoseconds. The pulse duty factor is approximately 1% and the number of pulses for a picture is between 1000 and 4000.

A further advantage of the invention is the shortest possible, low-inductance connection between the individual lasers and the connection between laser and laser driver for the lasers. Owing to the bond-wire connection of adjacent lasers and the use of ribbon-type conductors to connect the laser and the laser driver, a low-loss and interference-free connection is obtained within the lighting device.

The invention is described below with the aid of an exemplary embodiment and by referring to schematic drawings.

DETAILED DESCRIPTION OF THE PREFERRED EMBODIMENT

Figure 1:
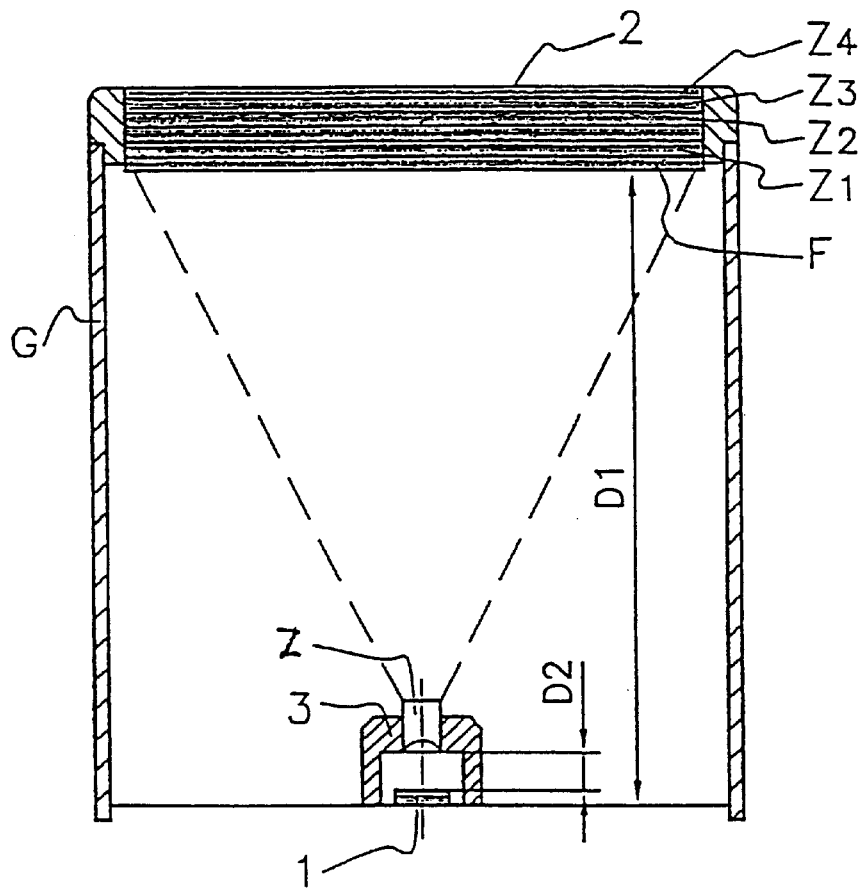
FIG. 1 is a schematic cross sectional view of a lighting device according to a preferred embodiment of the invention.

FIG. 1 shows an lighting device where a laser light source 1 and an optical element 2 are installed inside a housing G, at a distance D1 to each other. The distance D1, for example, amounts to 120 mm. The optical element 2 is designed as a square panel, e.g., having a surface area of 100 mm×100 mm, and is composed of several lenses. In this case, the lens F, which is located on the side facing the laser light source 1, is designed a large-surface convergent lens, e.g., as Fresnel lens, having a focal length that corresponds to the distance D1. This lens F is followed by additional cylindrical lenses, e.g. comprising a plurality of cylindrical microlenses on the side facing away from the laser 1, which are arranged immediately adjoining in one plane and have approximately the same focal length. However, this focal length is short as compared to the focal length for the convergent lens F. The cylindrical microlenses for the respective lens have identical widths. However, the individual lenses can have different widths. For example, four cylindrical lenses Z1, Z2, Z3, Z4 are arranged adjoining the Fresnel lens F. The microlenses for the lenses Z1, Z2, Z3, Z4 have, for example, a radius of 0.5 mm. The width B of the respective microlenses is, for example, 0.7 mm for the lens Z1, 0.5 mm for the lens Z2 and 0.2 mm for the lenses Z3, Z4. The lenses Z1, Z2 are arranged such that the laser light is expanded and an optimum illumination angle is adjusted. A uniform intensity distribution of the laser light is achieved with the lenses Z3, Z4. A holographic diffuser can also be used in place of the cylindrical lenses Z1 to Z4.

Figure 2:
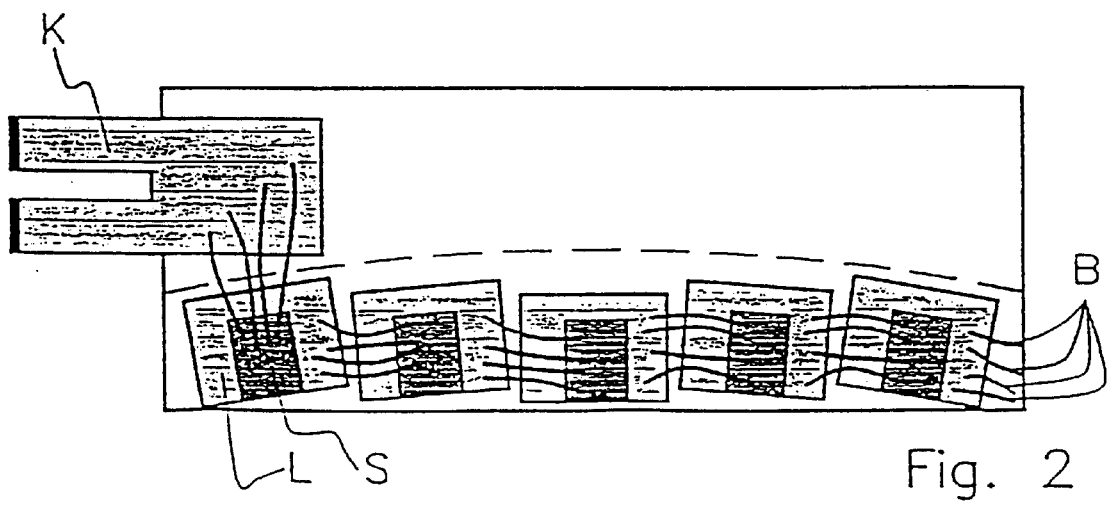
FIG. 2 is a schematic illustration of the laser source 1 of FIG. 1.

The laser light source 1 is composed of several electrically serially connected lasers L with the laser front surfaces S arranged at an angle to each other (FIG. 2). A circular-arc shaped arrangement of the lasers results, which makes it possible to achieve an optimum illumination of the optical element. For example, five lasers are arranged along a circular arc with a radius of 18 mm, the center point of which is located on the optical axis of a dispersing lens L that is arranged at the distance D2 to the laser light source (FIG. 1). As a result of the circular-arc shaped arrangement, the laser light strikes the dispersing lens without experiencing significant emission losses on the side. The individual lasers L are provided, for example, with four parallel bond wires B, which are produced through wedge bonding. As a result, a wide, low-induction and short connection is established. The lasers L are connected to the laser driver by a contact support point K and by means of a ribbon-type conductor. The ribbon-type conductor, for example, has a width of a 15 mm.

The laser light is expanded with the aid of dispersing lens Z, e.g., having a focal length of 6.3 mm, in order to achieve an optimum illumination of the optical element 2. The distance D2 amounts to approximately twice the focal distance f. A housing 3 with integrated cylindrical lens Z encloses the laser light source 1.

For the above-mentioned embodiment of the optical element 2 and the laser light source 1, the laser can be assigned to Class 1 for permissible light outputs of the lighting device of up to 80 W. The invention is not limited to the laser light source specified in the exemplary embodiment. Rather, the number of lasers L connected in series as well as the arrangement of the lasers can vary, depending on the desired light output. For example, two laser light sources with series-connected lasers can also be arranged in parallel, thereby making it possible to achieve a higher light output.

What is claimed is:

1. A lighting device for recording pictures, comprising a laser light source (1) and an optical element (2) illuminated by this light source for forming the laser light, with the illumination of the optical element occurring via a dispersive lens (Z) that is arranged between the laser light source (1) and the optical element (2), and wherein:

the laser light source comprises several electrically serially connected lasers that are arranged in a circular arc shape such that the center point of the circular arc is located on the optical axis of the dispersive lens (Z);

the optical element is configured with several cylindrical lenses, with the lens arranged on the side facing the laser light source (1) being a converging lens (F), with the converging lens being followed by additional cylindrical lenses (Z1, Z2, . . . ), and with these cylindrical lenses having a plurality of tightly joined, planar microlenses on the side facing away from the laser.

2. A lighting device according to claim 1, wherein the optical element comprises four cylindrical lenses (Z1, Z2, Z3, Z4), wherein two of the lenses (Z1, Z2) expand the laser light and the two of lenses (Z3, Z4) determine the intensity distribution of the laser light.

3. A lighting device according to claim 1, wherein the converging lens (F) is a Fresnel lens.

4. A lighting device according to claim 1, wherein the focal lengths of the microlenses for a cylindrical lens are the same for all and are small as compared to the focal length of the converging lens.

5. A lighting device according to claim 1, wherein the dispersive lens (Z) is arranged at a distance D2 from the laser light source (1), which distance corresponds approximately to twice the focal length of the dispersive lens (Z).

6. A lighting device according to claim 1, wherein the individual lasers (L) are connected to each other with low induction via bond wires.

7. A lighting device according to claim 1, wherein the laser light source (1) and the optical element (2) are arranged at a distance D1 that corresponds to the focal length of the converging lens.

8. A lighting device for recording pictures, comprising a laser light source (1) and an optical element (2) illuminated by this light source for forming the laser light, with the illumination of the optical element occurring via a dispersive lens (Z) that is arranged between the laser light source (1) and the optical element (2); and wherein:

the laser light source comprises several electrically serially connected lasers that are arranged in a circular arc shape such that the center point of the circular arc is located on the optical axis of the dispersive lens (Z);

the optical element is configured with a converging cylindrical lens (F) arranged on the side facing the laser light source (1) and a holographic diffuser on the side of the converging lens side facing away from the laser.

9. A lighting device according to claim 2, wherein the two additional cylindrical lenses (Z1, Z2) that expand the laser light are disposed adjacent to the converging lens (F), and are followed by the two lenses (Z3, Z4) that determine the intensity distribution of the laser light.

* * * * *